United States Patent [19]

Sugisawa et al.

[11] Patent Number: 4,524,080
[45] Date of Patent: Jun. 18, 1985

[54] METHOD OF IMPROVING QUALITY OF WHEAT FLOUR

[75] Inventors: Ko Sugisawa, Nara; Masanori Yamamoto, Suita; Masaru Shibuki, Kyoto; Yukihiro Nomura; Kouji Sengoku, both of Nara; Seiji Higashine, Nara, all of Japan

[73] Assignee: House Food Industrial Company Limited, Osaka, Japan

[21] Appl. No.: 504,375

[22] Filed: Jun. 14, 1983

[30] Foreign Application Priority Data

Jun. 16, 1982 [JP] Japan .............................. 57-102139

[51] Int. Cl.³ .......................... A21D 2/00; A21D 6/00
[52] U.S. Cl. .............................. 426/236; 315/111.21; 426/622
[58] Field of Search .............. 426/237, 238, 241, 242, 426/622, 235, 236; 315/111.21; 204/164

[56] References Cited

U.S. PATENT DOCUMENTS

| | | | |
|---|---|---|---|
| 812,764 | 2/1906 | Mitchell | 426/236 |
| 1,184,295 | 5/1916 | Alsop | 426/236 |
| 3,619,403 | 11/1971 | Gorin | 204/164 |
| 3,814,983 | 6/1974 | Weissflock et al. | 315/111.21 |
| 3,824,398 | 7/1974 | Boom | 204/164 |
| 3,876,373 | 4/1975 | Glyptis | 426/237 |

*Primary Examiner*—George Yeung
*Attorney, Agent, or Firm*—Weiss & Holloway

[57] ABSTRACT

A novel method for improving the quality of wheat flour, wherein the novelty resides in bringing the wheat flour into contact with a non-equilibrium plasma. The dough prepared from the wheat flour processed by this method exhibits an improved viscoelasticity, and the starch in this wheat flour shows a greater water holding capacity. Appearance and texture of the secondary products from this wheat are also improved remarkably.

5 Claims, 6 Drawing Figures

METHOD OF IMPROVING QUALITY OF WHEAT FLOUR

BACKGROUND OF THE INVENTION (1) Field of the Invention

The present invention relates to a method of improving the quality of wheat flour and, more particularly, to a method which can provide wheat flour of improved quality in a very short processing time and which is entirely harmless from the viewpoint of food sanitation and safety.

In the present specification, the term "quality improvement of wheat flour" is used to generally mean improvements in various known properties of wheat flour such as improvement in the viscoelasticity of the wheat dough and improvement in the water holding capacity of the starch in the wheat flour, as well as improvements in the properties of the secondary products such as appearance and texture of cakes made from the wheat flour.

(2) Description of the Prior Art

Hitherto, various methods have been proposed and used for improvement of the quality of wheat flour. These methods broadly fall into several types as shown below.

(i) Early maturing process as disclosed in Japanese Patent Publication No. 15138/1978 (Japanese Patent No. 936,704)

This method essentially consists in preserving the wheat flour for 2 to 20 days within an atmosphere of 40° to 70° C. The wheat flour is then directly put into use or mixed with unmatured wheat flour.

(ii) Heat-treating method as disclosed in U.S. Pat. No. 3,428,461

In this method, the wheat flour is heat-treated for a period of between 1 minute and 17 hours at a temperature of 150° to 360° F.

(iii) Quality improvement by addition of agent or contact with gas.

Methods have been proposed and partly put into practical use in which the wheat flour is improved by addition of agents such as potassium bromate ($KBrO_3$), ammonium persulfate (($NH_4)_2SO_5$), benzoyl peroxide or the like, as well as methods in which a gas such as chlorine dioxide ($ClO_2$) or nitrogen dioxide ($NO_2$) is brought into contact with the wheat flour.

The early maturing process mentioned in item (i) above can make the maturing period considerably shorter than that of the natural maturing method which requires preservation of the wheat flour for 2 to 3 months. This method, however, suffers from various drawbacks inherent in the maturing process: namely, necessity for troublesome wrapping of the wheat flour, necessity for a storage space for preservation and so forth, resulting in an impractically low efficiency of the work. Thus, this method is uneconomical as regards both time and space.

The heat-treating method mentioned in the item (ii) above is still unsatisfactory in that it cannot provide remarkable improvement in the water holding capacity and viscoelasticity of the wheat flour, although it can reform strong flour into a powder equivalent of wheat flour for making cakes.

The third method mentioned in the item (iii) above also involves problems as follows. Namely, potassium bromate is highly toxic. In fact, the minimum lethal dose of potassium bromate for oral administration on rabbits is 250 to 580 mg/kg (rabbit dies in 12 hours). Consumption of potassium bromate in excess of a predetermined limit causes lesions in the central nervous system of human. Therefore, it is necessary to pay specific attention to strictly observing use standards. Ammonium persulfate is not so toxic as potassium bromate but adversely affects the human body to cause, for example, allergic disease and dermatopathy when taken in a large amount. Ammonium persulfate, therefore, has to be handled with greatest care. The use of oxidizing agents such as benzoyl peroxide, chlorine dioxide and so forth leads to various problems. For instance, an excessive application of these oxidizing agent causes excessive oxidation and, hence, an excessive maturing of the wheat flour. In consequence, the extensibility of gluten is decreased and the appearance of the secondary product is deteriorated. The excessive use of oxidizing agent is also undesirable from the viewpoint of nutrition because it may cause decomposition of useful vitamines. In addition, these dioxidizing agents are rather difficult to handle and have unfavourable effects on the human body which cannot be ignored.

Nitrogen dioxide gas can provide only a small maturing or bleaching effect. For attaining a sufficient maturing or bleaching effect, it is necessary to use a large amount of nitrogen dioxide gas. This, however, is inevitably accompanied by a degradation in the hue of the secondary products.

It is true that the use of the quality improvement agents and the use of treating gases such as nitrogen dioxide gas advantageously shortens the processing time to less than that in the natural maturing method mentioned before. Such methods, however, involve a risk that the agent or gas which inevitably remains in the products will have an unexpected unfavourable effect on the human body as explained above.

Under these circumstances, there is an increasing demand for development of a method which can improve the quality of wheat flour in a short period of time without using any agent noxious from the viewpoint of food sanitation and safety.

In response to this demand, the present inventors have accomplished the present invention through an intense study in search of a method permitting an improvement of the quality of wheat flour without requiring the use of quality improving agents or treating gases harmful from the viewpoint of food sanitation and safety.

At the same time, the present inventors have made an investigation to search out prior techniques relating to the use of non-equilibrium plasma. As a result, it was confirmed that no approach has been made up to now to the application of non-equilibrium plasma to the processing of foodstuffs, particularly wheat flour, for the increase of the value added to the flour, although such application nowadays is found increasingly wide use for enhancing the value added to various products, e.g., for improvement of the hydrophilic and adhesive characteristics of high polymers, surface hardening treatment for metallic materials, application to processes for manufacturing integrated circuits, and so forth.

SUMMARY OF THE INVENTION

Accordingly, it is a primary object of the invention to provide a novel method which can improve the quality of wheat flour in a short period of time without using any noxious agent or gas.

To this end, according to the invention, there is provided a method of improving the quality of wheat flour having the steps of generating a non-equilibrium plasma by applying a high-frequency wave under a reduced pressure, and bringing the wheat flour into contact with the non-equilibrium plasma, whereby the quality of the wheat flour is improved in a very short period of time.

The wheat flours to which the invention pertains generally include all of strong flour, medium flour and weak flour, although the effect of the invention is most appreciable when the method is applied to weak flour. The term "strong flour" is used to mean flour which is usually used for breads and buns, while "medium flour" is flour which is normally used for noodles such as wheat vermicelli. "Weak flour" is flour used for cakes or the like.

The term "plasma" in this specification is used to mean a state in which the charged particles constituting a substance have been dissociated to form ionized gas by an extremely high level of energy applied to the substance. Plasma can be broadly divided into two types: namely, equilibrium plasma which is generated under a comparatively high gas pressure, and non-equilibrium plasma formed under a reduced gas pressure which is usually 10 to $10^{-2}$ Torr. Thus, the temperature of the non-equilibrium plasma is low and generally ranges between 20° and 500° C. Hence, the non-equilibrium plasma is referred to also as "low-temperature plasma". The gaseous atmosphere for forming the non-equilibrium plasma may consist mainly of air, nitrogen gas, oxygen gas, carbon dioxide gas and so forth, although the invention does not exclude the use of other gases which are safe from the viewpoint of food sanitation and safety.

In the method of the invention, the non-equilibrium plasma can be formed within one of the gases mentioned above, by means of an ordinary apparatus for generating low-temperature plasma. Thus, it is not necessary to provide a special apparatus, although a slight modification may be required for facilitating the operation.

Briefly, the method of the invention for improving the quality of wheat flour is as follows:

As the first step of the method, a batch of wheat flour is placed in a low-temperature plasma generating apparatus. More specifically, the wheat flour is put in a tray to form a thin bed of a uniform thickness of less than about 1 cm, preferably less than about 0.5 cm. Alternatively, the low-temperature plasma generating apparatus is provided with a stirring function. At any rate, in the method of the invention, it is a matter of significance to have the wheat flour come into contact with the non-equilibrium plasma at a high efficiency, and any type of contact may be adopted provided that it affords an efficient contact of the wheat flour and the plasma.

After the wheat flour is placed within the low-temperature plasma generating apparatus, the atmosphere in the apparatus is reduced to a predetermined level which is generally below 100 Torr. In general, smaller the degree of decompression (i.e., the higher the pressure of the atmosphere), the higher is the required power of the high-frequency wave mentioned later. From a practical point of view, therefore, the atmosphere is preferably decompressed to a level not higher than 20 Torr. As an alternative, it is possible to completely evacuate the apparatus and then charge it with the gas up to the level of the aforesaid reduced pressure.

Subsequently, a high-frequency wave (microwave) is applied to the atmosphere. The power and frequency of the high-frequency wave can be varied over comparatively wide ranges within those commonly used.

The power of the high-frequency wave, however, is closely related to the rate of processing, i.e., the processing time, of the wheat flour. Namely, it is possible to increase the processing rate and, hence, to shorten the processing time by increasing the power of the high-frequency wave. Usually, the frequency of the high-frequency wave falls within the region of radio waves or microwaves.

The generation of the non-equilibrium plasma can be confirmed through visual check of the light emitted by the plasma. The optimum time length of contact between the non-equilibrium plasma and the wheat flour depends on factors such as the power of the high-frequency wave, kind of gas, degree of decompression and rate of processing of the wheat flour. The contact period, however, is generally shorter than 60 minutes, preferably shorter than 10 minutes.

Other objects, features and advantages of the invention will become clear from the following description of the preferred embodiment taken in conjunction with the accompanying drawings.

DESCRIPTION OF THE PREFERRED EMBODIMENT

Figure 1:
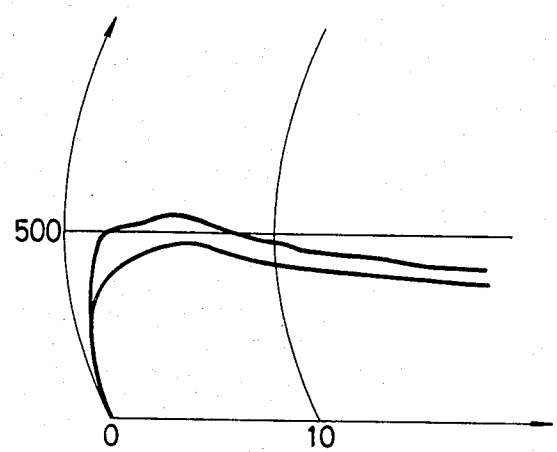
FIGS. 1 to 4 show farinograms of wheat flours processed in accordance with the method of the invention and other known treating methods, wherein the ordinate represents the strength of dough in term of Barbendor Unit (B.U.) while the abscissa represents the mixing time (minute) over which the wheat flour is mixed with water.

An explanation will be made hereinunder as to an example of an apparatus suitable for use in carrying out the method of the invention, with specific reference to FIG. 6.

The apparatus has a processing chamber 1 in which the wheat flour is made to contact with the plasma. A specimen holder 2 for placing the wheat flour thereon is mounted in the processing chamber 1. A gas discharge (exhaust) pipe 3 for discharging the gas from the processing chamber 1 is connected to the processing chamber 1. The discharge pipe 3 is provided with a stop valve 4 and a leak valve 5. A vacuum pump 7 is connected through a pipe 6 to the portion of the discharge pipe 3 between the stop valve 4 and the leak valve 5. A plasma generating furnace 9 is connected to the processing chamber 1 through a pipe 8. The plasma generating furnace 9 is connected also to a high-frequency wave oscillator 10 through a waveguide tube 11. The plasma generating furnace 9 is further connected to a gas cylinder 12 through a pipe 13. The pipe 13 is provided with a flow meter 14, flow-rate regulating valve 15 and a stop valve 16. A leak valve 17 is attached directly to the wall of the processing chamber 1 to permit the interior of the chamber 1 to be communicated with the ambient air as desired.

In the actual processing of the wheat flour for improving the quality, after a batch of the wheat flour is put on the specimen holder 2, the vacuum pump 7 is started with the valves 16, 5 and 17 closed to reduce the pressure in the processing chamber 1. When the internal pressure of the processing chamber 1 is reduced to a predetermined level, the valve 16 is opened to introduce a gas such as oxygen gas into the processing chamber 1 and, at the same time, high-frequency wave energy is supplied from the high-frequency wave oscillator 10 to the plasma generating furnace 9 through the waveguide tube 11. In consequence, a non-equilibrium plasma is formed within the plasma generating furnace 9 due to an interaction between the gas supplied from the gas cylinder 12 and the high-frequency wave energy supplied by the high-frequency oscillator 10. The plasma thus generated is introduced through the pipe 8 into the processing chamber to make contact with the wheat flour. After the processing of the wheat flour in this manner, the high-frequency wave oscillator 10 is stopped and the valve 4 is closed. The valve 16 is then closed while the supply of the gas from the gas source (bomb) 12 is stopped. Subsequently, after opening the leak valve 5, the vacuum pump 7 is stopped and the leak valve 17 is gradually opened to restore the processing chamber 1 to normal pressure. The wheat flour is then taken out of the processing chamber.

The wheat flour thus processed showed a quality equivalent or superior to that of wheat flour subjected to an ordinary maturing treatment or improvement by chlorine or the like, as will be realized from the following description of Examples.

EXAMPLE 1

(Method of Invention)

A batch (100 g) of wheat flour (weak flour) was put in a tray to form a bed of about 0.5 cm in thickness. The tray was then placed on the specimen holder 2 within the processing chamber 1 of the apparatus shown in FIG. 6. Then, the interior of the processing chamber 1 and the plasma generating furnace 9 was decompressed to 2 Torr. Subsequently, a non-equilibrium plasma was formed in the plasma generating furnace 9, by applying a microwave of a frequency of 2450 MHz at a power of 1 KW after introducing oxygen gas at a rate of 200 ml/minute. The thus generated non-equilibrium plasma was introduced into the processing chamber 1 to make contact with the wheat flour for 5 minutes. Meanwhile, the interior of the processing chamber was held at a reduced pressure of 2 Torr by the continuous operation of the vacuum pump 7.

(Known Maturing Treatment)

By way of reference, a batch (100 g) of wheat flour was placed in an open plastic vessel and was matured by being held in the air for 4 days at 70° C.

(Microwave Treatment Under Normal Pressure)

By way of reference, a microwave treatment was conducted in which a tray charged with a batch (100 g) of wheat flour in the form of a bed about 0.5 cm thick was placed in a known microwave treating apparatus. The wheat flour was then treated by a microwave of 2450 MHz and 1 KW power under normal pressure.

Figure 4:
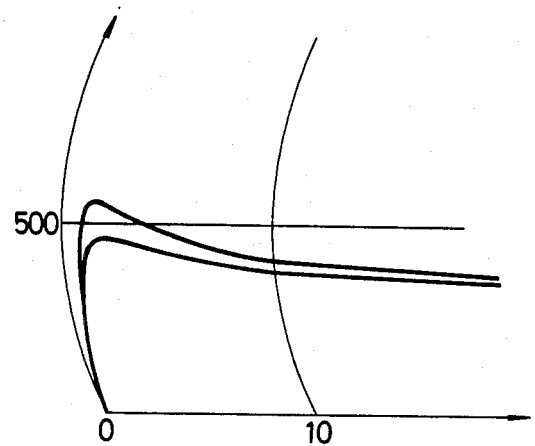
Figure 5:
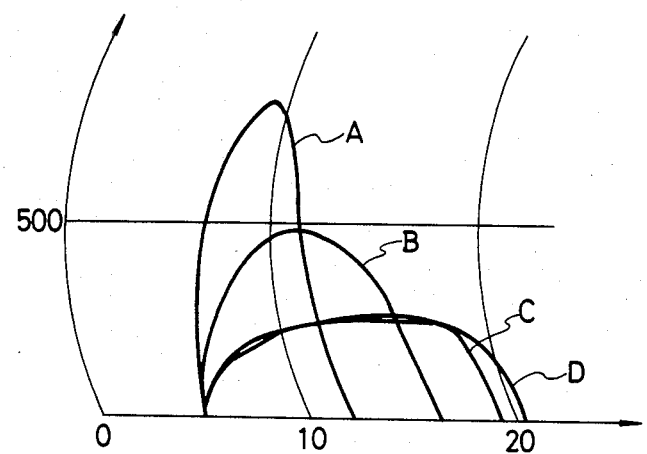
FIG. 5 shows extensograms of wheat flours, in which the ordinate represents the resistance of wheat dough to extension in terms of B.U. while the abscissa represents extensibility of the wheat dough.

A comparison was made of the qualities of the wheat flours processed or treated as above, as well as untreated wheat flour, by means of a farinograms and extensograms. Namely, FIGS. 1, 2, 3 and 4 are farinograms as obtained for the wheat flour treated by the method of the invention, the wheat flour subjected to the maturing treatment, wheat flour treated by microwave treatment under normal pressure and untreated wheat flour, respectively. On the other hand, FIG. 5 is an extensogram of these wheat flours, in which curves A, B, C and D show, respectively, the extensograms obtained for the wheat flour processed by the method of the invention, wheat flour subjected to the maturing treatment, wheat flour processed by microwave treatment under normal pressure and untreated wheat flour. In each of FIGS. 1 to 4, the ordinate represents the strength in terms of Brabender Unit (B.U.) of the wheat dough while the abscissa represents the mixing time (minute) after adding of water to the wheat flour. The water absorption rate was measured for each wheat flour, when the water content of the wheat flour itself was 13.5%. The wheat flour processed by the method of the invention showed a water absorption rate of 57.8%, while the wheat flour subjected to the maturing treatment showed a water absorption rate of 55.6%. The water absorption rate of the wheat flour treated by microwave under normal pressure and the water absorption rate of untreated wheat flour were measured to be 53.6% and 52.5%, respectively. In FIG. 5, the ordinate represents the resistance to extension (B.U.) of wheat flour, while the abscissa represents the extensibility (cm) of the wheat flour.

(Evaluation)

The water absorption rate and the farinogram-pattern (see FIG. 1) of the wheat flour processed by the method of the invention are compared with the water absorption rate and the farinogram-pattern (see FIG. 4) of the untreated wheat flour. The wheat flour processed by the method of the invention exhibited a water absorption rate of 57.8% which is considerably higher than that (52.5%) shown by the untreated wheat flour. The length of time (peak time) from the moment of start of the mixing till the moment at which the level of 500 B.U. was reached is longer in the wheat flour processed by the method of the invention (FIG. 1) than in the untreated wheat flour (FIG. 4). Similarly, the length of time (stability) from the moment of the peak till the moment at which the upper end of the farinogram curve leaves the line of 500 B.U. is longer in the wheat flour processed by the invention (FIG. 1) than in the untreated wheat flour (FIG. 4). Valorimeter value (V.V.) was read by applying a specific scale to the central points of the farinograms at a moment 12 minutes after the peak time. The valorimeter value obtained with the wheat flour processed by the method of the invention (FIG. 1) is greater than that obtained with the untreated wheat flour (FIG. 4). From these facts, it is clearly understood that the dough prepared from the wheat flour processed by the method of the invention exhibits a greater strength than that prepared from the untreated wheat flour.

Figure 2:
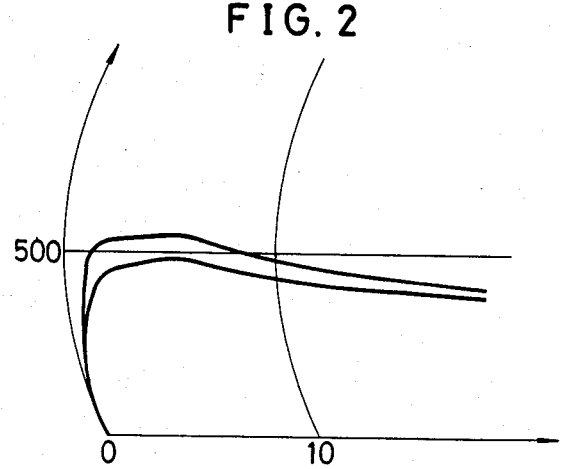
Figure 3:
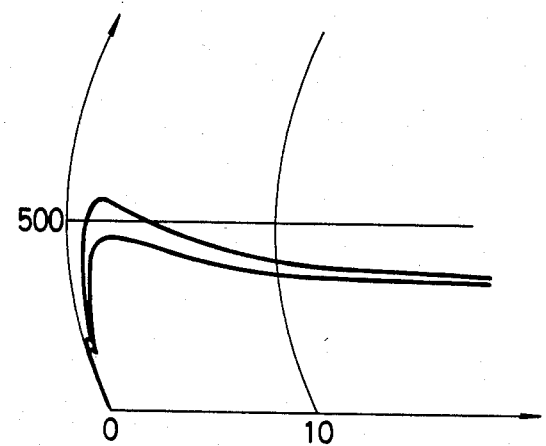

The wheat flour subjected to the maturing treatment exhibited a similar value of water absorption rate to that of the wheat flour processed by the method of the invention. At the same time, the farinogram-pattern of the wheat flour subjected to the maturing treatment (see FIG. 2) shows a similar tendency to that (see FIG. 1) of the wheat flour processed by the method of the invention. Namely, the peak time, stability and the valorimeter value as obtained with FIG. 2 are similar to those obtained with FIG. 1. However, in regard to the extensogram-pattern shown in FIG. 5, the wheat flour (curve A) processed by the method of the invention exhibits much greater resistance to extension than other wheat flours.

These facts obviously show that the method of the invention offers a superior effect on the improvement of the quality of the wheat flour over other known methods also in the aspect of the viscoelasticity of the dough. For reference, the viscoelasticity of the dough prepared from the wheat flour treated by microwave under normal pressure (see FIG. 3 and curve C in FIG. 5) showed a viscoelasticity substantially equal to that of the untreated wheat flour. Thus, the microwave treatment under normal pressure could not provide a substantial effect toward quality improvement.

EXAMPLE 2

To confirm the quality improvement effect by the method of the invention, the water holding capacity was measured for each of the wheat flours employed in Example 1. At the same time, cakes were baked from the wheat flours used in Example 1 and an organoleptic test was conducted to evaluate the appearance and texture of such cakes.

A. Measurement of Water Holding Capacity of Starch

Doughs were prepared by adding 15 ml of water to 30 g of the respective wheat flours. Starch was extracted from each dough by adding 500 ml of 1M-NaCl. The starch obtained by centrifugation of the above-mentioned NaCl solution was added to 500 ml of water and was stirred with the water for 30 minutes at room temperature. The mixture was then subjected to a further centrifugation and the precipitate was dried in air at 40° C. Then, 6 ml of water was added to 3 g of the dried product, i.e. the starch, and the mixture was centrifuged for 15 minutes at 2000 r.p.m. After weighing the thus obtained sediment, the water holding capacity of the starch was calculated in accordance with the following formula:

$$\text{water holding capacity of starch} = \frac{(C - B) + B \times \frac{A}{100}}{B \times \left(1 - \frac{A}{100}\right)}$$

where, A represents the water content (%) of the dried product, B represents the weight (g) of the dried product and C represents the weight (g) of the sediment.

B. Baking of Cakes

| Compounding ratio | |
| --- | --- |
| wheat flour | 30 parts |
| cow's milk | 50 parts |
| granulated sugar | 30 parts |
| salt-free butter | 20 parts |
| baking powder | 0.5 part |
| vanilla essence | trace |

After stirring and blending, the compound was put in a circular vessel of 18 cm dia. and was then heated in an oven for 40 minutes at 160° C. to become a baked cake.

The result of the measurement of the water holding capacity, as well as the result of the organoleptic test, is shown in Table 1 below.

TABLE 1

| treating method | water holding capacity of starch | organoleptic evaluation of cake | | |
| --- | --- | --- | --- | --- |
| | | appearance | texture | remarks |
| method of invention | 0.844 | 5 | 5 | Fine, uniform and puffy structure with no depression. Elastic and plump texture and good "melting" oral feeling. |
| maturing | 0.817 | 3 | 3 | Cake structure rather non-uniform and less puffy. Texture elastic but rather viscous. |
| microwave under normal pressure | 0.796 | 1 | 1 | Cake structure non-uniform and involving large local bubbles or cavities with apparent depression. Texture not plump and rather viscous. |
| untreated | 0.794 | 1 | 1 | Same as above |

The evaluation of appearance and the texture was made by the 5-point method, assuming the appearance and texture of the cake baked from untreated wheat flour to be "1" and the most favourable appearance and texture to be "5".

As will be clearly seen from Table 1, the starch extracted from the wheat flour processed by the method of the invention exhibits a superior water holding capacity. In addition, the cake baked from this wheat flour exhibits excellent appearance and texture over the cakes baked from other wheat flours. Thus, the method of the invention is quite effective in improving the quality of the wheat flour in all of the viscoelasticity of the dough, water holding capacity of starch and the adaptability to secondary processing such as the baking of cakes. In addition, the extent or degree of improvement of the quality is higher than that offered by the maturing treatment which does not necessitate any noxious substances such as quality improvement agents or chlorine gas.

In the method of the invention for improving the quality of wheat flour, the improvement is achieved by application of a non-equilibrium plasma generated from a gas harmless from the viewpoint of food sanitation and safety, e.g. oxygen, air or the like. Therefore, the wheat flour processed by the method of the invention does not suffer from the problem of residual noxious matters such as quality improvement agent or chlorine gas. Furthermore, the quality improvement according to the invention can be achieved in a very short period of time as compared with the maturing treatment.

EXAMPLE 3

Figure 6:
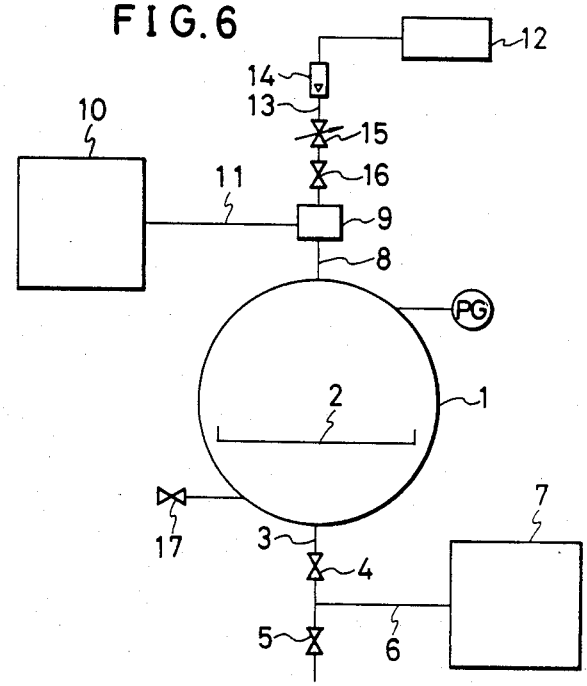
FIG. 6 shows an example of an apparatus suitable for use in carrying out the method of the invention.

A batch (100 g) of wheat flour was laid to form a bed 0.5 cm thick within a tray which was then placed on the specimen holder 2 in the processing chamber 1 of the apparatus shown in FIG. 6. Then, the pressure in the processing chamber 1 and the plasma generating furnace 9 was reduced to 5 Torr. Then, after supplying the plasma generating furnace 9 with air at a rate of 200 ml/min, a non-equilibrium plasma was generated by applying a microwave of 2450 MHz at a power 1.2 KW. The non-equilibrium plasma was then introduced into the processing chamber 1 to make contact with the wheat flour for 0.5 minute. Meanwhile, the pressure in the processing chamber 5 was maintained at the reduced level of 5 Torr by the continuous operation of the vacuum pump 7. The wheat flour thus treated showed superior viscoelasticity and water holding capacity, as well as high adaptability of secondary processing such as baking of cakes.

EXAMPLE 4

A batch (10 g) of wheat flour was laid to form a bed 0.5 cm thick within a tray which was then placed on the specimen holder 2 in the processing chamber 1 of the apparatus shown in FIG. 6. Then, the pressure in the processing chamber 1 and the plasma generating furnace 9 was reduced to 0.3 Torr. Then, after supplying the plasma generating furnace 9 with air at a rate of 20 ml/min, a non-equilibrium plasma was generated by applying a microwave of 2450 MHz at a power 100 W. The non-equilibrium plasma was then introduced into the processing chamber 1 to make contact with the wheat flour for 10 minutes. Meanwhile, the pressure in the processing chamber 5 was maintained at the reduced level of 0.4 Torr. by the continuous operation of the vacuum pump 7. A remarkable improvement in quality equivalent to that in Example 3 was confirmed also in this case.

Although the invention has been described through specific examples, it is to be understood that the invention is not limited to the described embodiment and various changes and modifications may be imparted thereto without departing from the scope of the invention which is limited solely by the appended claims.

What is claimed is:

1. A method of improving the water holding capacity of wheat flour, which comprises contacting said wheat flour for a time period of less than 60 minutes with a non-equilibrium plasma which is generated under a reduced pressure of lower than 100 Torr. in a gas selected from the group consisting of air, nitrogen gas, oxygen gas and carbon dioxide gas by applying a high frequency wave selected from the group consisting of radiowave and microwave.

2. A method of improving the water holding capacity of wheat flour according to claim 1, wherein said wheat flour is weak flour.

3. A method of improving the water holding capacity of wheat flour according to claim 1, wherein said non-equilibrium plasma is generated under a reduced pressure of lower than 20 Torr.

4. A method of improving the water holding capacity of wheat flour according to claim 1, wherein said wheat flour is held in contact with said non-equilibrium plasma for a period of not longer than 10 minutes.

5. The product prepared in accordance with the method of claim 1.

* * * * *